United States Patent [19]

Nagel

[11] Patent Number: 4,976,429
[45] Date of Patent: Dec. 11, 1990

[54] HAND-HELD VIDEO GAME IMAGE-PROJECTING AND CONTROL APPARATUS

[76] Inventor: Dietmar Nagel, 147 South Rd., Chester, N.J. 07930

[21] Appl. No.: 281,252

[22] Filed: Dec. 7, 1988

[51] Int. Cl.$^5$ .......... A63B 67/00; A63P 9/22
[52] U.S. Cl. .................. 273/1 E; 273/85 G; 273/DIG. 28; 353/DIG. 3; 353/122; 358/230; 340/725
[58] Field of Search ........... 353/DIG. 3, DIG. 5, 353/122, 120; 352/131, 132; 358/241, 245, 236, 230, 231; 340/725; 350/334; 273/85 G, 1 GC, 1 E, DIG. 28, 138 A, 143 R, 1 L; 434/365

[56] References Cited

U.S. PATENT DOCUMENTS

| | | | |
|---|---|---|---|
| 4,222,641 | 10/1980 | Stolov | 353/122 |
| 4,359,222 | 11/1982 | Smith et al. | 340/725 |
| 4,392,652 | 7/1983 | Knight et al. | 273/DIG. 28 |
| 4,489,939 | 12/1984 | Spector | 273/1 L |
| 4,491,325 | 1/1985 | Bersheim | 273/148 B |
| 4,579,338 | 4/1986 | Heffron | 273/1 E |
| 4,589,659 | 5/1986 | Yokoi et al. | 273/85 G |
| 4,596,390 | 6/1986 | Studley | 273/DIG. 28 |
| 4,643,421 | 2/1987 | Meyer | 273/DIG. 28 |
| 4,713,007 | 12/1987 | Alban | 273/DIG. 28 |
| 4,770,525 | 10/1988 | Umeda et al. | 353/122 |
| 4,836,786 | 6/1989 | Wong | 434/365 |

FOREIGN PATENT DOCUMENTS 4846694 7/1989 U.S.S.R. .............. 434/365

Primary Examiner—Edward M. Coven
Assistant Examiner—Dean Small
Attorney, Agent, or Firm—Cohen, Pontani & Lieberman

[57] ABSTRACT

A portable, hand-held display and control apparatus for operatively demountably receiving an interactive electronic video game module includes a housing formed of a central body and a pair side-mounted, outwardly-extending arms by which the housing is grasped by a user. Illuminating elements within the housing project images from a substantially transparent screen of the video game module onto a remote viewing and display surface. A plurality of switches and like control elements on the housing arms are user-actuatable for interactive control of the video game.

17 Claims, 2 Drawing Sheets

HAND-HELD VIDEO GAME IMAGE-PROJECTING AND CONTROL APPARATUS

FIELD OF THE INVENTION

The present invention relates to electronic video games and, more particularly, to apparatus for controlling such video games and for displaying images associated with the course or play of such games.

BACKGROUND OF THE INVENTION

Interactive electronic video games require some sort of display device upon which images associated with the operation and play of the game are generated for ready viewing by a user. Most commonly, these images are produced on a cathode ray tube such as the screen of a conventional television, or on a computer imaging display, or on a dedicated electronic display which forms an integral part of the video game apparatus. Such video games, however, disadvantageously require that the user remain in close proximity to the bulky and not easily movable television or other fixed display apparatus and are not, therefore, readily portable from place-to-place nor conveniently usable in locations lacking an appropriate electronic display device.

Miniaturized, hand-held electronic video games are also known in the art. Such games typically incorporate a tiny display screen—as of liquid crystal construction and on the order of one-and-one-half by two inches—and fit, in their entireties, in the palm of a user's hand. Although extremely portable and generally usable at virtually any desired location without regard to the availability of a separate display apparatus, these hand-held games suffer the disadvantage of the small size of the built-in display screen; a user will often experience both difficulty in viewing small details of or changes in the images generated on the tiny screen, and rapid eye fatigue when these miniaturized electronic video games are used for extended periods of time.

OBJECTS OF THE INVENTION

It is accordingly the desideratum of the present invention to provide an apparatus for substantially unrestricted viewing and display of images generated by an interactive, electronic video game.

It is a particular object of the invention to provide such an apparatus for use in conjunction with a conventional electronic video game.

It is another object of the invention to provide such an apparatus that is readily portable and conveniently hand-held during use.

It is a further object of the invention to provide such an apparatus for the display of images associated with the operation of the video game on any of a multiplicity of readily available, nonelectronic viewing surfaces.

It is yet another object of the invention to provide such an apparatus for displaying suitably and controllably enlarged images on selected remote viewing surfaces.

Other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

In the drawing, wherein similar reference characters denote similar elements throughout the several views.

DETAILED DESCRIPTION OF THE PREFERRED EMBODIMENT

The present invention is directed to a display and control device for an interactive electronic video game. By way of the invention images generated by and associated with the operation of an interactive electronic video game are projectable onto a user-selected remote viewing and display surface and the video game is interactively controllable by the user thereby affecting the course or play of the video game and, correspondingly, the remotely projected images. It is generally intended and preferred that the device be portably hand-held for ready orientational control of the projection of images on a user-selected remote display surface concurrent with interactive use of the game. It is further preferred that the video game be in the form of a substantially self-contained module which is demountably receivable in a receptacle in the device housing so as to enable ready substitution and interchangeability of a multiplicity of different game modules for playing any of a virtually unlimited variety of video games.

Figure 1:
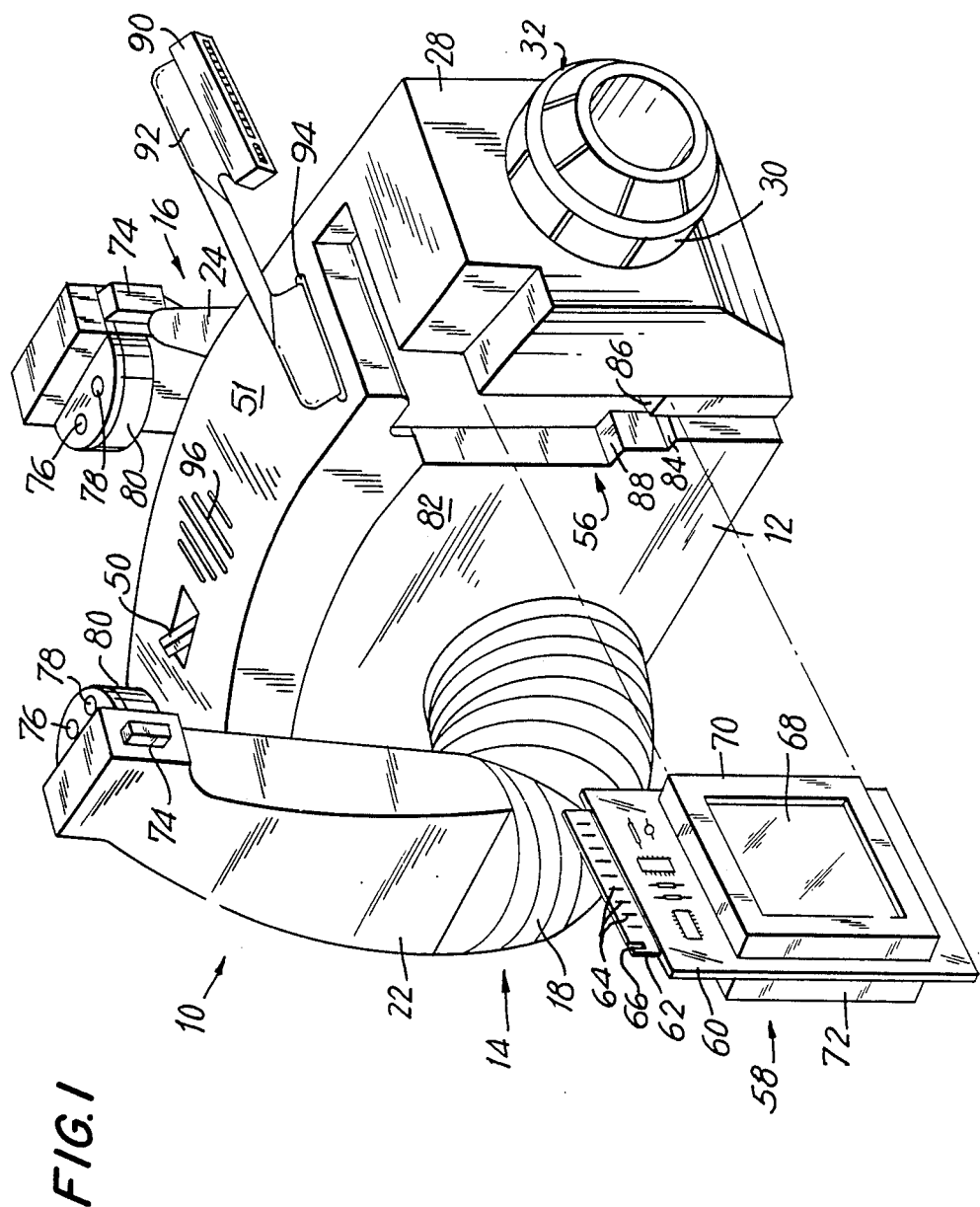
FIG. 1 is an elevated perspective view of a display and control apparatus for operatively demountably receiving an interactive electronic video game module in accordance with the invention.
Figure 2:
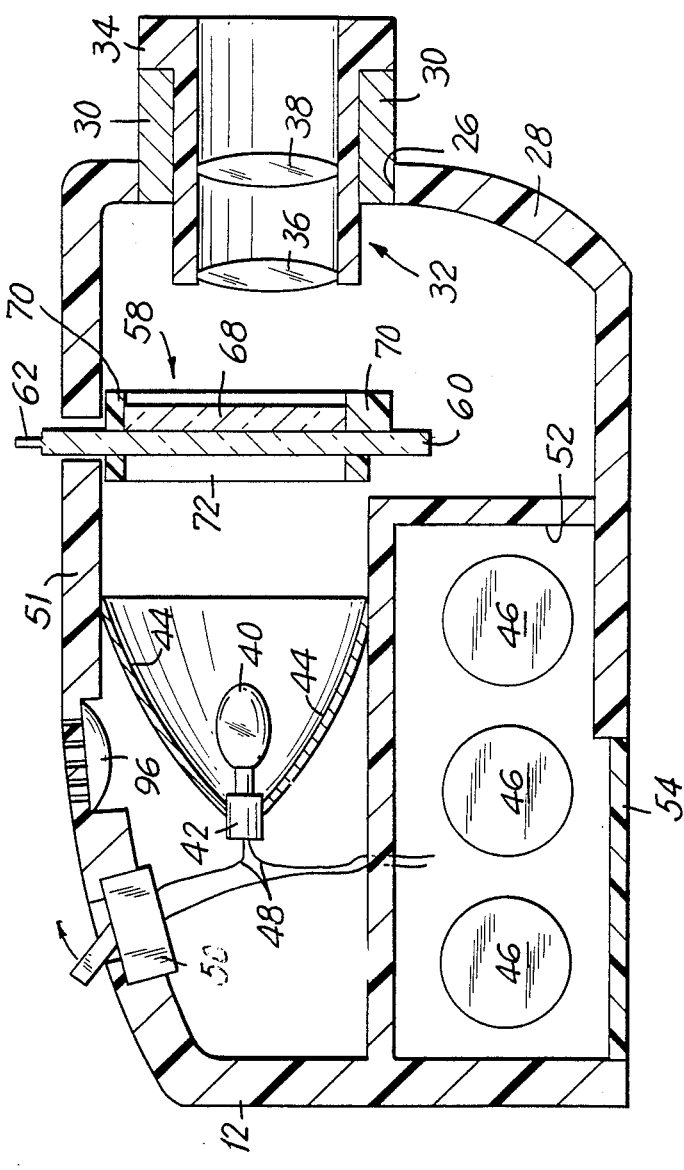
FIG. 2 is a substantially central cross-sectional view of the display and control apparatus of FIG. 1 wherein certain elements have been omitted.

Turning now to the drawings, a currently preferred embodiment of a video game display and control device or apparatus in accordance with the invention, identified by the general reference numeral 10, is illustrated in FIG. 1 and, with certain elements omitted for clarity, in the substantially central cross-section of FIG. 2. The apparatus there shown comprises a housing formed of a central body 12 and pair of arms 14, 16 which depend outwardly and upwardly from opposite sides of the body 12. More particularly, arms 14, 16 are connected to the central body at generally tubular, corrugated extensions 18, 20 which support respective handles 22, 24 operatively graspable by a user's hands for supporting, orienting and operating the device 10 as will hereinafter become clear. The arm extensions 18, 20 may be hollow or otherwise incorporate interior passages therethrough for carrying electrical leads or wires (not shown) between user-operable video game controls and the like carried on or proximate the handles—as hereinafter described—and the body 12. The extensions 18, 20 may be rigid or, if desired, suitably flexible to permit selected variation of the relative orientations of the handles with respect to each other and the central body. Similarly, although it is generally contemplated that the handles 22, 24 be fabricated of rigid material such, for example, as plastic, they may alternatively be formed of a predeterminately flexible material, or bear a suitably malleable or deformable exterior covering to enhance their comfortable retention by the user, or otherwise modified from the form herein described or illustrated as a matter of design choice. Indeed, the housing can take on almost any configuration or appearance—as, for example, by incorporating the entire apparatus 10 in an armless simple or stylized box or otherwise shaped housing—as a matter of design choice. All such variations are within the scope and contemplation of the invention.

A circular opening 26 defined in the front wall 28 of the body 12 carries about its periphery a collar 30 that projects outwardly from the wall 28. Collar 30 receives a lens assembly 32 for axial movement with respect to the collar to enable manual focusing of projected images on a remote viewing surface as will become apparent. In the presently illustrated embodiment of the invention, assembly 32 comprises a hollow, tubular member within which first and second double-convex lens elements 36, 38 are fixedly secured.

Disposed within the interior of housing body 12 is a lamp 40 which, with the application of a suitable electric potential thereto, generates light for effecting the projection of video game-associated images onto a remote viewing surface. Lamp 40 is releasably retained in a lamp socket 42 carried by a parabolic or otherwise-configured reflector 44 by which light generated by the lamp is directed toward lens assembly 32 in the front wall 28 of body 12. Electrical power for operating the lamp 40 may be provided by one or a plurality of conventional batteries 46 that are connected to the lamp by wires 48 through a manually-actuatable on-off switch 50 accessibly mounted to an appropriate part, such as the top wall 51, of the central body 12. Batteries 46 may be located in a separate compartment 52 disposed within the interior of body 12 and accessible through a moveable or removable body panel 54. Of course, the apparatus 10 may also or alternatively be powered by an external source of electrical potential as a matter of design choice, although the need to employ an external power source will obviously lessen the preferred operative portability of the display and control apparatus of the invention.

The apparatus 10 further includes a receptacle, generally designated 56, for demountably receiving an interactive electronic video game module 58. Receptacle 56 may take on any of a multiplicity of configurations for releasably receiving a game module 58 in any of a plurality of optional orientations. Thus, the configuration of receptacle 56 will, at least in part, depend on the shape and construction of the video game module as well as on the intended manner of inserting the module into the receptacle and for effecting electrical connections and communication between the game module and the apparatus 10 of the invention. In the disclosed embodiment—which is intended as illustrative only—the interactive video game module 58 is fabricated on a substantially flat substrate 60, such as a printed circuit card or the like, having a protruding edge connector 62 that carries on at least one of its faces a plurality of conductive regions or traces 64. Edge connector 62, by way of which electrical communication with the game module is effected, may also conventionally include an orienting slot 66 to assure its proper electrical connection to the apparatus 10 as should be well understood.

It should be further understood that, except as otherwise expressly noted herein, the construction, operation and most other aspects of the video game module 58 are unrelated to and comprise no part of the present invention. Indeed, such details concerning the module 58 are generally of interest only insofar as they bear on associated constructional details of the apparatus 10 such, for example, as the manner in which the module is demountably receivable in the receptacle 56. Thus, the game module 58 may, as a matter of design choice, take on any suitable form or construction and no effort is made in this disclosure to describe the specific electronics by which the module defines an interactively-operable video game or generates images associated with the course of the game; all such information is considered to be well within the knowledge and ability of those of ordinary skill in the art. Miniaturized handheld interactive electronic video games of this type are readily commercially available from such manufacturers as Tiger (Model Nos. 7-753, 7-742 and 7-745), Playtime (Model No. 1864), Xenon (model No. 8801-7) and Remco (Model No. 15101). Indeed, the module 58 may, if desired, substantially comprise the printed circuit board or card substrate from any of these games.

It is generally intended that the video game module 58 be substantially self-contained in the sense that the module include substantially all of the operating components and elements necessary to define the game and its operation, with the sole exception of those operating controls by which the user interactively communicates with and thereby affects the course of the game. To this end, it is anticipated that the video game module 58 will include the usual multiplicity of various electronic components on its substrate 60 for defining and enabling the normal operation of the game. In any event, irrespective of the precise configuration or of any other features or aspects of the video game module, it is required in accordance with the invention that the module 58 include a substantially transparent display screen on which images associated with the course and play of the game are operatively defined. For example, readily available miniaturized interactive electronic video games—such as those referred to above—typically incorporate a substantially transparent liquid crystal display (LCD) screen, as for example on the order of approximately one-and-one-half by two inches in size, on which the game electronics generates images indicative to the user of the course or progress of the game. These miniature LCD screens are eminently suitable for use in conjunction with the display and control apparatus 10 of the present invention and, as such, game modules which include LCD screens are currently preferred.

Thus, the FIG. 1 depicted video game module 58 includes a substantially transparent LCD screen 68 peripherally encircled by a retaining frame 70 which projects outwardly from one face of the substrate 60. The opposite face of the game module card or substrate 60 similarly carries a positioning frame 72 having a central opening located so that the frame surrounds the active area of the LCD screen 68. Although the respective central openings of the frame members 70, 72 will be of generally the same size, their exterior dimensions may advantageously differ so as to assure proper orientational insertion of the game module 58 into receptacle 56. In the illustrated embodiment of the apparatus 10 therefore, wherein the game module 58 is horizontally slidable into the receptacle 56, the screen-retaining frame 70 has a greater vertically-downward extension than the positioning frame 72.

Thus, in the illustrated display and control apparatus 10, the receptacle 56 is correspondingly configured for horizontally slidably receiving the video game module 58 there shown. More particularly, receptacle 56 comprises a channel or cavity open at one side 82 of the body 12 and, if desired, closed at the other. The receptacle further includes a support 84 for the bottom of the game module substrate 60, a shoulder 86 for supporting the bottom surface of the retaining frame 70, and a ledge 88 for supporting the corresponding bottom surface of the positioning frame 72. With the game module 58 fully seated in receptacle 56, edge connector 62 projects upwardly beyond the top wall 51 of body 12 (FIG. 2).

Electrical connections between the apparatus 10 and the video game module 58 are made by way of a single, conventional edge connector socket 90 that is receivable about the game module edge connector 62. Socket 90 is carried on a ribbon cable 92 or the like which extends from socket 90 into the interior of the housing body 12, as for example through a slot 94 in top wall 51, for electrically connecting its various wires or leads to, inter alia, the switches 74, 76, 78. Socket 90 and cable 92 may also electrically connect the game module 58 to a speaker 96 optionally secured to the housing outer wall for generating an audio signal output associated with the course or play of the game. Of course, the game module 58 may instead, or additionally, incorporate an integral speaker or like audio output device (not shown) as a matter of design choice.

As previously mentioned, the manner and orientation in which the game module 58 is operatively receivable in the housing receptacle 56 is also a matter of design choice. For example, receptacle 56 may be suitably configured so that the game module 58 slides demountably downward from above—i.e. through an opening in the top wall 51—of the housing body 12. Similarly, the manner in which the electrical connections between the game module 58 and apparatus 10 are effected may be varied as desired. Thus, although the embodiment of apparatus 10 herein expressly described features an external socket 90 for manual placement about the edge connector 62 of module 58, an equivalent connector socket or the like, for example, may be disposed within the interior of receptacle 56 so that, as the game module 58 is inserted into and seated within the receptacle, the required electrical connections between the module and the apparatus 10 are completed without further intervention by the user. Here, again, such variations are within the scope and contemplation of the invention.

Each of the handles 22, 24 carries a plurality of controls by which the user may interactively communicate with the game module 58 and thereby affect the course or play of the game. Thus, as seen in FIG. 1 each handle includes a front-mounted, preferably spring-loaded, depressible button switch 74 and secondary control switches 76, 78 carried on an extension boss or platform 80 that projects in the direction of the respective opposite handle and substantially transverse to the handle elongation. In a particularly preferred form of the invention, the switches 74, 76, 78 are so disposed that, when a user's hand is wrapped about one of the handles 22, 24, the user's second finger falls naturally over the position of switch 74, and the secondary switches 76, 78 are readily accessible by the user's thumb. It should also be recognized and appreciated that control components other than switches may be incorporated in or disposed proximate the handles 22, 24 either in addition to or in place of any one or more of the switches 74, 76, 78. By way of example, the switches 74 may be replaced by variable resistors so that, by depression of the spring-loaded buttons 74, the resistances of those elements may be predeterminately varied to present the game module 78 with a control signal akin to that generated by a joystick or like controller. Moreover, the controls 74, 76, 78 may be located on any suitably accessible portion of the apparatus housing, whatever its shape or appearance. These and other alternate arrangements and variations are fully within the contemplation of the invention.

In use, a video game module 58 is inserted into the housing receptacle 56, as by substantially horizontally sliding the module into and through the open side of the receptacle channel until it abuts the closed opposite sidewall of the housing body 12. Socket 90 is then manually placed over edge connector 62 on the game module substrate 60 to complete the various electrical connections between the module and the display and control apparatus 10 of the invention. The apparatus 10 is next activated by actuation of on-off switch 50 to apply electrical power to the lamp 40 and, preferably though not necessarily, to game module 58. The game of the module 58 may then be played by the user through appropriate user-controlled manipulation of the switches 74, 76, 78.

More particularly, a user of the apparatus 10 holds and supports the same by grasping one of the handles 22, 24 in each hand. While so grasping the handles, the user orients the housing—and, specifically, the central body 12—so that the lens assembly 32 points toward a selected remote viewing and display surface, such as a light-colored wall, for projecting images on that surface. Light from the lamp 40 is directed by reflector 44 through the substantially transparent screen 68 in the seated game module 58 and, from there, through the lens assembly 32 whereby the images on screen 68 are enlarged and focused on the remote surface. Thus, by gripping the handles 22, 24, the user holds and supports the apparatus 10, has ready finger access to the plural switches 74, 76, 78 through which interactive control of and communication with the video game is operatively achieved, and dynamically orients the housing body 12 so as to direct the projected images from the game module screen 68 onto a selected remote viewing and display surface. Additional fine focusing of the projected images on the remote surface, to the extent necessary, can be conveniently carried out by relative axial adjustment of the position of lens assembly 32 in its retaining collar 30.

It is generally intended and most preferred that the apparatus 10 be constructed of such size and materials so that it is sufficiently portable and lightweight to permit it to be comfortably and nonobtrusively hand-held for extended periods of time as the user plays one or a series of interactive video-based electronic games. Accordingly, it is a further feature of the display and control apparatus of the invention that the video game modules are readily demountable for convenient interchangeability and substitution. The same display and control apparatus 10 may therefore be advantageously employed by a user for playing a virtually unlimited variety of interactive video games through simple substitution of one game module 58 for another.

While there have been shown and described and pointed out fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A display and control device for an interactive electronic video game module which includes a substantially transparent screen integral with the module and on which images associated with the game are operatively defined, said device comprising:

a housing including receptacle means defined in said housing for demountably receiving an interactive electronic video game module selectively insertable into and removable from said receptacle means by a user of said device;

projection means in said housing for projecting images operatively defined on the video game screen onto a remote display surface physically separate from and unconnected to said housing, said projection means comprising an illuminator and an opening in said housing, and said illuminator and said opening being located on opposite sides of said receptacle means so that, with the video game module mounted in said receptacle means, light from said illuminator projects through the substantially transparent screen and outwardly from the housing through said opening onto a remote display surface for ready viewing of the projected images by the user;

wherein said receptacle means comprises a channel defined in said housing between said illuminator and said opening and predeterminately configured for slidable releasable receipt of the video game module;

user-manipulatable means on said housing for controlling an operating characteristic of the interactive electronic video game module and thereby interactively affecting the images operatively defined on the screen and projected out of said housing onto a remote display surface for ready viewing by the user;

said housing being predeterminately sized and configured so as to be portably lightweight and hand-held by a user who directs the projected images onto a selected remote display surface by controllably orienting said hand-held housing during use of said device; and a handle graspable by a user's hand for enabling the user to conveniently supportedly hand-hold and controllably orient the housing for selectively directing the projected images onto the selected remote display surface.

2. A display and control device in accordance with claim 1, wherein said projection means further comprises lens means proximate said opening for focusing the projected images from the video game screen onto the remote display surface.

3. A display and control device in accordance with claim 1, wherein said projection means further comprises means for supplying electrical power to said illuminator for causing said illuminator to generate light, and switch means selectively actuatable for applying said electrical power to said illuminator.

4. A display and control device in accordance with claim 2, wherein said projection means further comprises means for supplying electrical power to said illuminator for causing said illuminator to generate light, and switch means selectively actuatable for applying said electrical power to said illuminator.

5. A display and control device in accordance with claim 1, wherein said user-manipulatable means is carried on said handle.

6. A display and control device in accordance with claim 1, wherein said user-manipulatable means is disposed proximate said handle.

7. A display and control device in accordance with claim 1, wherein said user-manipulatable means comprises a switch.

8. A display and control device in accordance with claim 5, wherein said user-manipulatable means comprises a switch.

9. A display and control device in accordance with claim 6, wherein said user-manipulatable means comprises a switch.

10. A display and control device in accordance with claim 1, wherein the interactive electronic video game module comprises a substantially unitarily self-contained module.

11. A display and control device in accordance with claim 1, wherein said projection means further comprises sound generating means for producing an audible output associated with the operation of the video game.

12. A display and control device in accordance with claim 1, wherein said receptacle means channel is predeterminately configured for releasably retaining the video game module in said channel.

13. A display and control device in accordance with claim 1, wherein said illuminator comprises a lamp.

14. A display and control device in accordance with claim 13, wherein said illuminator further comprises a reflector associated with said lamp for directing light generated by the lamp through the substantially transparent screen of the video game module and outwardly through said opening onto a remote display surface.

15. A display and control device in accordance with claim 1, wherein said housing comprises a body and a pair of handles depending from opposite sides of said body, said handles being readily graspable by a user's hands for enabling the user to conveniently supportedly hand-hold and controllably orient the housing for projecting an image from the substantially transparent screen of the video game onto a remote display surface.

16. A display and control device in accordance with claim 15, wherein said user-manipulatable means is carried on at least one of said handles.

17. A display and control device in accordance with claim 15, wherein said user-manipulatable means comprises a user actuatable switch carried on at least one of said handles.

* * * * *